May 8, 1962 W. R. SHEARER 3,033,485
COMBINATION SPIN AND FLY CASTING REEL
Filed Jan. 3, 1961 2 Sheets-Sheet 1
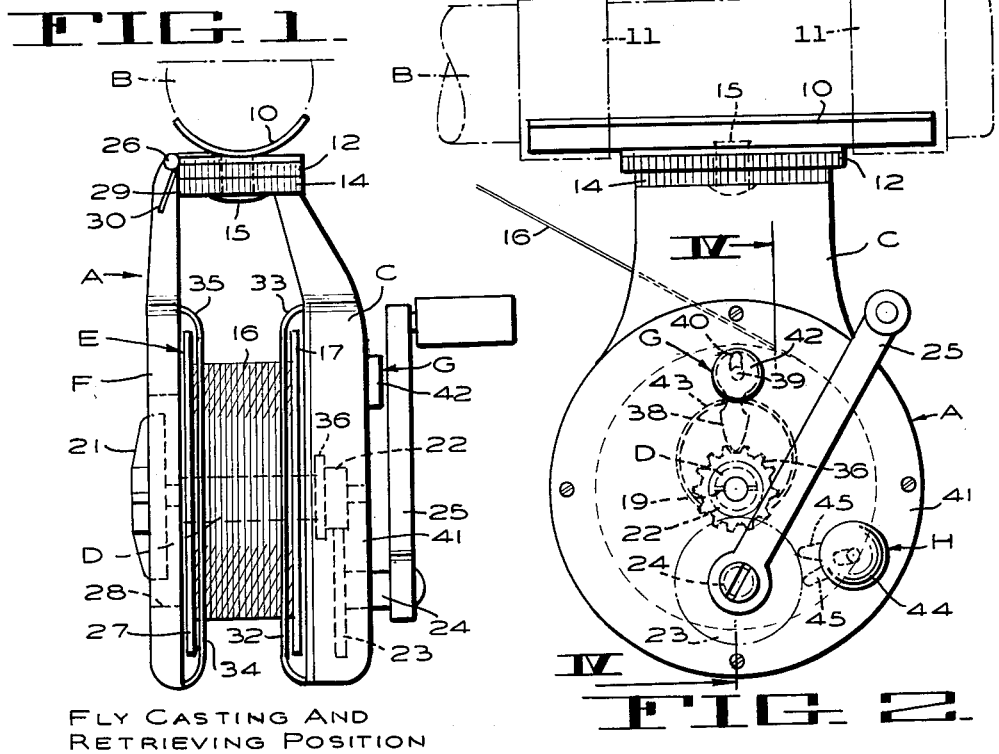
FLY CASTING AND
RETRIEVING POSITION
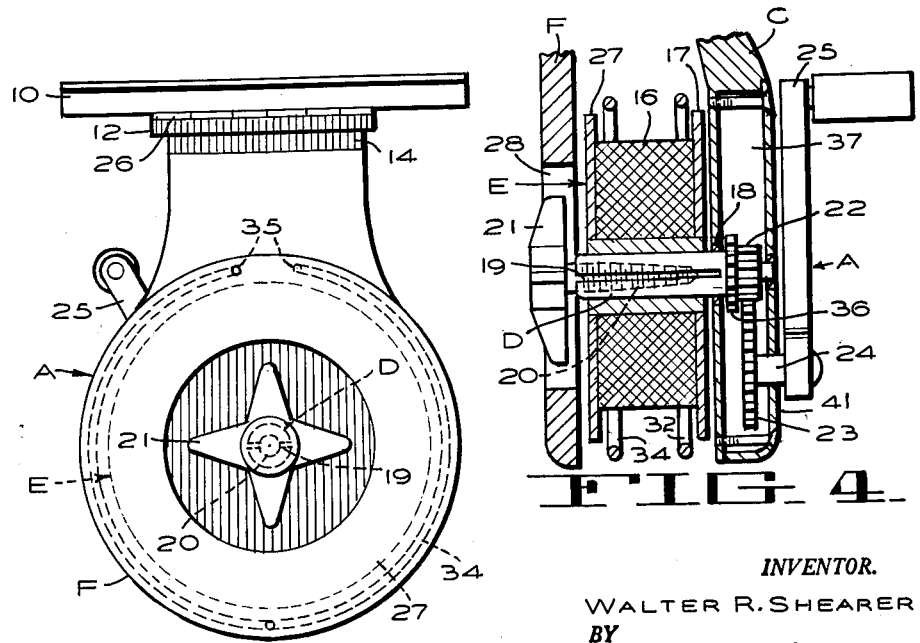
*INVENTOR.*
WALTER R. SHEARER
BY
Munn & Liddy
ATTORNEYS

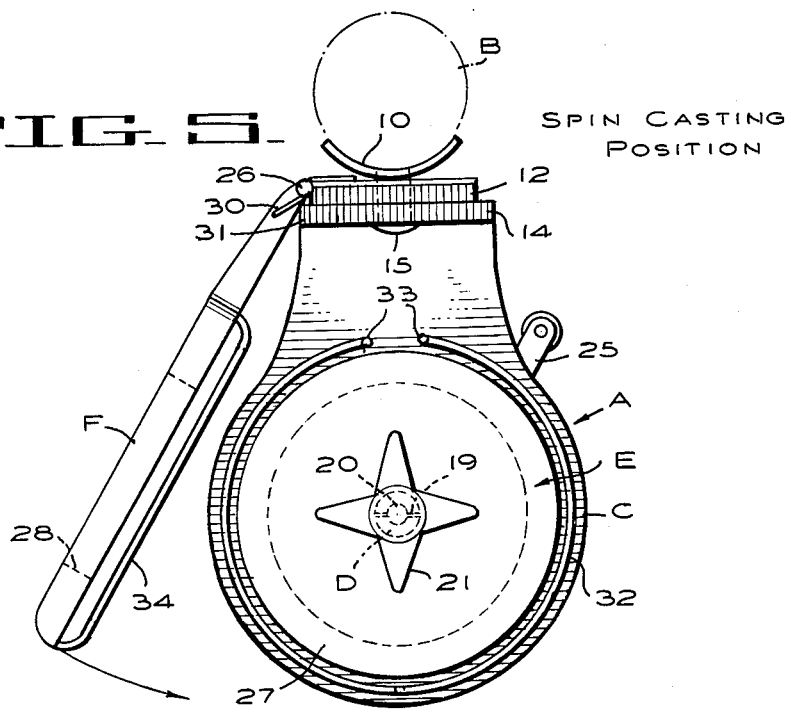
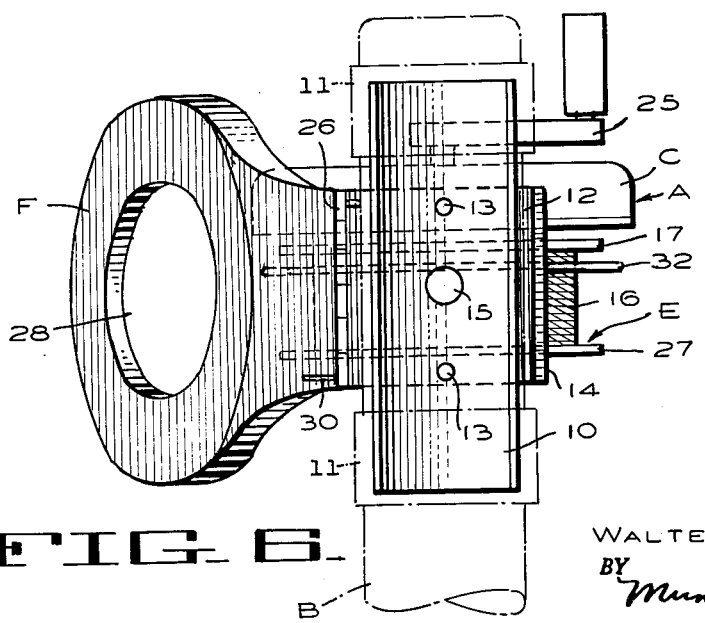

United States Patent Office 3,033,485
Patented May 8, 1962

3,033,485
COMBINATION SPIN AND FLY CASTING REEL
Walter R. Shearer, 860 Lincoln Way, Napa, Calif.
Filed Jan. 3, 1961, Ser. No. 80,161
2 Claims. (Cl. 242—84.2)

The present invention relates to improvements in a combination spin and fly casting reel. It has particular reference to that type of reel in which the axis of a spool is arranged to extend transversely relative to the length of a fishing rod for fly casting and retrieving; the spool being movable into a position so that its axis will parallel the length of the fishing rod for spin casting.

Another object is to provide a combination spin and fly casting reel in which a swingable cover is movable into a position adjacent to one end of the spool during fly casting and retrieving, this cover being swingable automatically into a position to clear the spool when the latter is disposed for spin casting.

A still further object is to provide line guards which are disposed around the ends of the spool to prevent fouling of the fishing line during fly casting and retrieving. These line guards are movable into a position so as to permit free withdrawal of the line from the spool during spin casting.

Other objects and advantages will appear as the specification proceeds. The novel features of the invention will be set forth in the appended claims.

Drawings

For a better understanding of the invention, reference should be had to the accompanying drawings, forming part of this specification, in which:

FIGURE 1 is an end elevational view of my combination spin and fly casting reel, when being used for fly casting and retrieving;

FIGURE 2 is an elevational view, and looking at the handle side of the reel;

FIGURE 3 is an elevational view of the opposite side of the reel, and observing the swingable cover;

FIGURE 4 is a transverse sectional view taken along the irregular line IV—IV of FIGURE 2;

FIGURE 5 is an end elevational view, when the reel is being used for spin casting; and FIGURE 6 is a top plan view of FIGURE 5.

While I have shown only the preferred form of my invention, it should be understood that various changes, or modifications, may be made within the scope of the annexed claims without departing from the spirit thereof.

Detailed Description

In carrying my invention into practice, I provide a combination spin and fly casting reel designated generally at A having a rod-attaching bracket 10. This bracket is adapted to be mounted on a fishing rod B by any suitable means, such as conventional ferrules 11 (see FIGURES 2 and 6). Obviously, the reel A may be positioned above or below the pole B, depending upon the fancy of the fisherman.

It will be noted that a bearing plate 12 is tightly secured to the rod-attaching bracket 10 by rivets 13 (see FIGURE 6), or other suitable fastening means. Moreover, a swivel plate 14 abuts the bearing plate 12; and a journal pin 15 holds these two plates together, with the swivel plate being rotatable in either direction on the journal pin. A side frame C is fixed to the swivel plate 14 so as to swing therewith in either direction.

With particular reference to FIGURE 4, it will be observed that a shaft D is supported by the side frame C so as to project therefrom, whereby a manufacturer's spool E having fishing line 16 thereon may be telescoped over the shaft D, with one flanged end 17 of the spool being disposed adjacent to the side frame C (see FIGURES 1, 4 and 6).

As shown in FIGURE 4, the shaft D extends through a bearing 18 provided in the side frame C. This shaft has a slot 19 extending lengthwise thereof, and a tapered screw 20 is threaded into a bore in the shaft D so as to expand the shaft against the spool E, when the screw is turned in one direction by an operating knob 21. This will provide a drag on the spool E and preventing free unwinding of the fishing line 16.

It will be appreciated, of course, that the manufacturer's spool E upon which the fishing line 16 is contained, when purchased from a store, may be readily applied to the shaft D. Also, the fisherman may change from one spool of line to another, depending upon the type of line desired on a particular occasion.

For the purpose of rotating the shaft D, a pinion 22 is fixed to this shaft. This pinion meshes with a gear 23 which is fixed to a stub shaft 24, the latter being journalled in the side frame C and being provided with a crank 25 for turning the stub shaft 24 and thereby rotating the spool E.

As an important structural feature, a swingable cover F is attached by a hinge 26 to the bearing plate 12 for swinging about an axis extending at right angles to the axis of the journal pin 15. This arrangement will permit the cover F to be moved into a position adjacent to the flanged end 27, as shown in FIGURES 1 and 4. At this time, the axis of the spool E extends transversely relative to the length of the fishing rod B for fly casting and retrieving. The cover F is fashioned with an opening 28 to receive the operating knob 21 and affording access thereto, when the spool E is disposed for fly casting and retrieving (see FIGURES 1 to 4, inclusive).

Turning now to FIGURES 5 and 6, it will be noted that the side frame C has been rotated about the journal pin 15 so that the axis of the spool E parallels the length of the fishing pole B for spin casting. At this time, the cover F has been swung about the axis of the hinge 26 so as to clear the side frame C and the spool E for spin casting, that is, the line 16 may be pulled off the spool E with great rapidity without requiring rotation of the spool. It is common practice to provide a weight (not shown) at the outer end of the fishing line 16; and, as the weight is cast through the air, the line must be free to unwind.

The bearing plate 12 and the swivel plate 14 are both rectangular in outline. When the reel A is arranged for fly casting and retrieving, as in FIGURE 1, the swingable cover F is urged against a flat side 29 of the swivel plate by a spring 30 provided on the hinge 26. At this time, the spring automatically urges the cover F into a position adjacent to the flanged end 27 of the spool E. However, it will be observed that the swivel plate 14 has a greater length than width (see FIGURE 5 for length and FIGURE 1 for width). Accordingly, when the side frame C and spool E are moved into spin casting position, as in FIGURE 5, the flat end 31 of the swivel plate 14 will engage with the cover F for automatically swinging the cover into spin casting position, that is, the cover will not interfere with the free unwinding of the fishing line 16 from the spool E.

The side frame C has a line guard 32 disposed to extend around one end of the spool E adjacent to the flange 17 of the spool (see FIGURES 1, 4 and 5). The ends 33 of the line guard 32 are secured to the side frame C. Likewise, the cover F is provided with a line guard 34 (see FIGURES 1, 3 and 4) which is disposed to extend around the other end of the spool E adjacent the flange 27, when the spool is disposed in fly casting and retrieving position, as disclosed in FIGURE 1. However, the line guard 34 has its ends 35 secured to the cover F and is movable with the cover F so as to clear the spool E and the line 16, when the spool is moved into spin casting position, as shown in FIGURE 5, thereby affording free unwinding of the line. The loops of the line guards 32 and 34 are large enough to slide over the end flanges 17 and 27, respectively, of the spool and serve to prevent fouling of the fishing line by keeping the line on the spool.

Referring now to FIGURES 1, 2 and 4, I have provided a "click" device designated generally at G. As shown in these views, a toothed wheel 36 is disposed in a compartment 37 formed in the side frame C, and this wheel is fixed to the shaft D so as to turn therewith. A detent 38 is secured to a stub shaft 39, and the latter projects through a slot 40 fashioned in a cover plate 41 of the side frame. This stub shaft has an operating button 42 arranged on the exterior surface of the cover plate 41. When the button 42 is pressed toward the shaft D, an arcuate spring 43 yieldingly urges the detent 38 into engagement with the teeth of the wheel 36. This will produce a "clicking" noise as the crank 25 is turned. However, when the button 42 is moved outwardly, the detent 38 will be retracted from engagement with the wheel 36.

Moreover, a crank handle lock H is provided (see FIGURE 2), which operates in three positions: (1) it locks the crank 25 for forward rotation only; (2) it locks the crank for rear rotation only; or (3) it may be moved so as to allow the crank to turn freely in either direction. This lock may be made of any suitable construction. For the purpose of illustration only, I have shown an operating button 44 that is connected with a detent 45, which is arranged to coact with the teeth on the gear 23. When this detent is swung into the lower position, as shown in FIGURE 2, the crank 25 may be turned in a clockwise direction only. Upon swinging the detent 45 into the upper position disclosed in FIGURE 2, the crank 25 may be turned only in a counterclockwise direction.

However, upon retracting the detent 45 out of engagement with the gear 23, the crank 25 may be turned freely in either direction.

It is quite apparent that the reel A may be reversed so that the side frame C and the crank 25 will be positioned on either the right or the left side of the fishing rod B, and the spool E may still face forward when being used for spin casting. Thus the combination spin and fly casting reel is adapted for use by either a right-handed or a left-handed fisherman.

I claim:

1. In a combination spin and fly casting reel: a rod-attaching bracket adapted to be mounted on a fishing rod; a bearing plate fixed to the bracket; a swivel plate abutting the bearing plate; a journal pin holding the two plates together, with the swivel plate being rotatable in either direction on the journal pin; a side frame fixed to the swivel plate so as to swing therewith; a shaft supported by the side frame so as to project therefrom, whereby a spool having fishing line thereon may be telescoped over the shaft, with one end of the spool being disposed adjacent to the side frame; means operable to hold the spool fixed to the shaft so as to turn therewith; means operable to rotate the shaft; the side frame being swingable about the journal pin so that the axis of the spool may extend transversely relative to the length of the fishing rod for fly casting and retrieving, or into a position wherein the axis of the spool parallels the length of the fishing pole for spin casting; a swingable cover attached to the bearing plate for swinging about an axis extending at right angles to the axis of the journal pin, whereby the cover may be moved into a position adjacent to the other end of the spool during fly casting and retrieving; the cover being swingable into a position to clear the side frame and the spool, when the spool is disposed in spin casting position; said swivel plate having a peripheral portion disposed to engage with the cover for automatically swinging the cover into spool-clearing position, when the side frame and spool are moved into spin casting position.

2. In a combination spin and fly casting reel; a rod-attaching bracket adapted to be mounted on a fishing rod; a bearing plate fixed to the bracket; a swivel plate abutting the bearing plate; a journal pin holding the two plates together, with the swivel plate being rotatable in either direction on the journal pin; a side frame fixed to the swivel plate so as to swing therewith; a shaft supported by the side frame so as to project therefrom, whereby a spool having fishing line thereon may be telescoped over the shaft, with one end of the spool being disposed adjacent to the side frame; means operable to hold the spool fixed to the shaft so as to turn therewith; means operable to rotate the shaft; the side frame being swingable about the journal pin so that the axis of the spool may extend transversely relative to the length of the fishing rod for fly casting and retrieving, or into a position wherein the axis of the spool parallels the length of the fishing pole for spin casting; a swingable cover attached to the bearing plate for swinging about an axis extending at right angles to the axis of the journal pin, whereby the cover may be moved into a position adjacent to the other end of the spool during fly casting and retrieving; the cover being swingable into a position to clear the side frame and the spool, when the spool is disposed in spin casting position; said swivel plate having a peripheral portion disposed to engage with the cover for automatically swinging the cover into spool-clearing position, when the side frame and spool are moved into spin casting position; and a spring for automatically swinging the cover into a position adjacent to one end of the spool, when the spool is moved into fly casting and retrieving position.

References Cited in the file of this patent

UNITED STATES PATENTS

| 2,705,113 | Bonanno | Mar. 29, 1955 |
| 2,731,214 | Bogar | Jan. 17, 1956 |
| 2,746,695 | Clay | May 22, 1956 |
| 2,884,211 | Holahan | Apr. 28, 1959 |
| 2,941,748 | Matthiesen | June 21, 1960 |